Dec. 11, 1923.
H. LOHMANN
1,477,508
PROCESS AND DEVICE FOR MAKING SHARPLY DEFINED CASTINGS
Filed Aug. 26, 1921
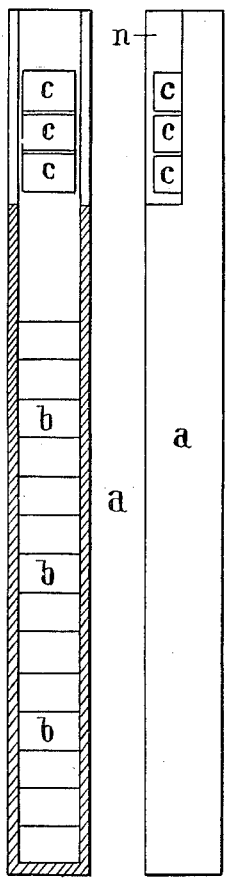
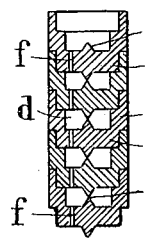
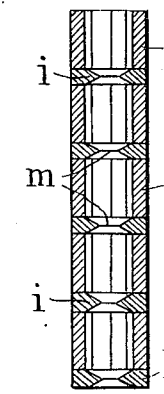
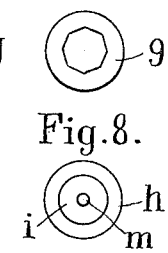
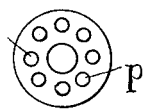
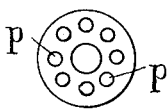
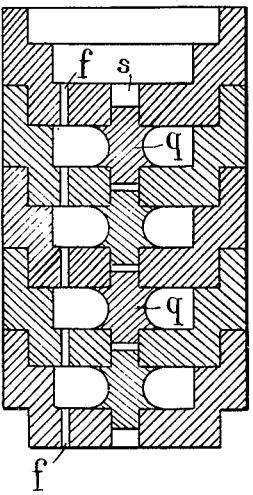
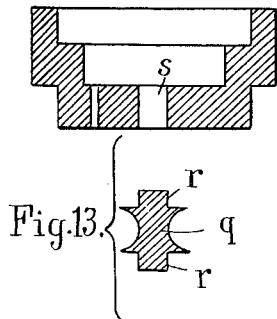
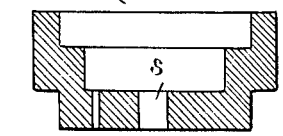
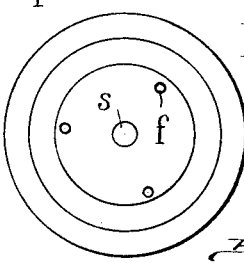
Inventor
Hugo Lohmann
By
Attorney Patented Dec. 11, 1923.

1,477,508

UNITED STATES PATENT OFFICE.

HUGO LOHMANN, OF BERLIN-JOHANNISTHAL, GERMANY.

PROCESS AND DEVICE FOR MAKING SHARPLY-DEFINED CASTINGS.

Application filed August 26, 1921. Serial No. 495,735.

(GRANTED UNDER THE PROVISIONS OF THE ACT OF MARCH 3, 1921, 41 STAT. L., 1313.)

*To all whom it may concern:*

Be it known that I, HUGO LOHMANN, a citizen of the German Republic, residing at Sternplatz 4ª, in Berlin-Johannisthal, in the German Empire, have invented certain new and useful Improvements in Processes and Devices for Making Sharply-Defined Castings, for which I have filed application in German Empire, Oct. 25, 1917, Patent 309851; German Empire, Nov. 6, 1917, Patent 310600; German Empire, Nov. 24, 1917, Patent 310840; Holland, Mar. 31, 1921, Serial 18,958; Czechoslovakia, Mar. 31, 1921, Serial 2591/21; France, Mar. 30, 1921, Serial 142405; Poland, Mar. 30, 1921, Serial 3484; Denmark, Jan. 12, 1920, Serial 124/20; Norway, Jan. 29, 1920, Serial 19211; Hungary, Mar. 20, 1921, Serial L. 4826; Austria, Mar. 30, 1921, Serial A 2054/21; Great Britain, Jan. 10, 1921, Serial 1462/21; Spain, Dec. 22, 1919, Patent 71843; Sweden, Jan. 14, 1920, Patent 49385; Switzerland, Dec. 23, 1919, Patent 88922; Luxemburg, Oct. 17, 1921, Patent 12371, and of which the following is a specification.

This invention relates to a process and a mould for the manufacture of sharply defined or embossed cast bodies, of which a number are to be cast in a single operation, use being made of centrifugal force.

The invention relates particularly to the production of cast bodies from difficultly fusible and valuable metals, such for example, as tungsten, tungsten carbide, molybdenum, molybdenum carbide, uranium, titanium, vanadium, boron, silicon, and the like.

One of the objects of my invention is to assemble a large number of moulds in as restricted a space as possible, which is particularly important for electrical welding and casting furnaces, in order to secure as small a diameter of the heating chamber as possible and a uniform heating of the fused mass of metal, so that this mass will be adapted to enter all the moulds at the same temperature, and to obtain as perfect a utilization of the valuable metal as possible, so that the parts of the metal which are lost or which are not fully utilized, such as deadheads, special moulding parts and the like are reduced to a minimum. Furthermore the new process has the advantage of rapidly feeding the charge into the moulds or containers.

Other advantages and objects of this invention will appear as the description of the invention with reference to the drawings proceeds.

Broadly speaking, my process consists in causing the metal to flow through moulds, which are placed in succession in a tubelike, non-fusible member, formed, for example, of retort carbon, and which are connected to each other by narrow connecting passages, the metal to be melted being placed in the foremost part of the tube. The tube is placed in a centrifugal furnace which is set in rotation after the melting process is commenced. By this means the metal is forced by the centrifugal force into all the highly heated moulds in succession, completely filling said moulds.

Among other uses of my invention I may mention as of particular importance for the manufacture of wire drawing stones and moulds of metal and the like to be used in wire manufacturing and wire drawing machines as substitutes for the expensive diamond wire drawing stones, diamond dies, diamond drawing nozzles and the like. It is possible in this manner to manufacture faultless devices of this and similar kind formed during the course of manufacture which are either entirely or for the greater part with the necessary holes or perforations or recesses, so as to require only subsequent dressing or adjustment, consequently the moulds which serve for the manufacture of such cast grindstones or honing devices, are of special importance.

In the accompanying drawing I have shown by way of example several means of carrying out my invention.

Fig. 1 is a longitudinal section through a container showing the moulds and blocks of metal therein.

Fig. 2 is an elevation of said tube showing the cutaway portion for insertion of the moulds and blocks.

Fig. 3 is a plan view of one of the containers.

Fig. 4 is a sectional view showing the nesting of the moulds one within the other, somewhat enlarged as compared with Figs. 1 and 2.

Fig. 5 is a bottom view of one of said moulds.

Fig. 6 is a different form of mould.

Fig. 7 is a view showing the hexagonal bore of the mould shown in Fig. 6.

Fig. 8 is a bottom plan view of the spacing member for the moulds or blocks.

Fig. 9 shows a cross-section through a mould adapted for moulding drill points.

Fig. 10 shows a grouping of several moulds in a single container.

Fig. 11 shows in section another form of moulds stacked and telescoping one within another.

Fig. 12 is a bottom plan of one of the moulds shown in Fig. 11.

Fig. 13 shows two moulds and the connecting aperture forming insertion piece separated.

$a$ is a tube as infusible material, such for example of retort carbon. In this tube a number of cylindrical members $b, b$ are arranged one on top of the other so as to fill this tube down to the lower wall or nearly to said wall. The upper part of the tube $a$ is cut away at $n$, and into the recess or aperture thus formed small blocks of metal $c, c$ to be melted may be inserted, and these blocks of metal fill up the hollow spaces provided in the cylinders $b$.

The casting moulds are constructed and arranged for use as follows. See Figures 4 and 5.

The bodies $b, b$ are formed identically in shape and when tightly nested into each other as shown in Fig. 4 hollow spaces $d$ are formed between them which are adapted to be filled up by the material to be cast. The apertures or recesses in the wire drawing mold or stone or the like to be manufactured are obtained and left clear of the casting mass by providing the bottom $o$ of each of the members $b$ with a corresponding number of projections or tips $e, e$, two of such projections being shown by way of example. The points of two confronting projections touch one another. In the bottom $o$ of each part $b$ there are also provided perforations $f$ of which three are shown by way of example in Fig. 5, these perforations or passages $f$ constituting connecting means between the several cavities or hollow chambers $d$.

When thus assembled the casting mould is inserted in the tube $a$. If this tube is now placed in the heating furnace of an electric furnace or an equivalent device, which is secured in a radial position on a horizontally or vertically mounted wheel or equivalent device, not shown on the drawings, the operator waits until the metal blocks $c$ begin to melt, then the furnace is rotated, and the molten material is hereby caused to flow through the passages $f$, into every single cavity $d$. After cooling down, it is only necessary to break the tube $a$ and the moulds, whereupon the separate individual wire-drawing stones, mould, or the like emerge in a sharply defined form, each provided with perforations, recesses or indications thereof which merely require a finishing or dressing operation. It is obvious that by working in this manner waste of metal is avoided if such an amount of metal is employed as to correspond to the sum of the amounts of metal required for all the mould cavities $d$.

Figures 6, 7 and 8 show a modified form of casting mould which is constructed similarly to the mould shown in Figs. 1 to 5, and which may serve for instance for the manufacture of rock drill points. The small blocks $g$ may each be provided with for example, a six cornered hole, and between said blocks washers $h$ are inserted, the inner edges of which are bevelled off, so as to produce a comparatively small intermediate space or chamber $m$. After the casting has been completed in this modification, the several individual members may be separated by breaking them away from each other at the point $m$, when the mould has cooled down.

In Figure 9 I have shown conventionally a cross sectional view through a mould adapted to serve for the point of a drill. In this case washers or intermediate members corresponding to the members $h$ of Figure 6, but which are constructed so as to sharply define the configuration of the edge of the drill, may be inserted between the several moulds.

In the embodiment of the invention so far described there is only one casting mould in series with the next succeeding one, but it is obvious that several casting moulds $p$, see Fig. 10, may be arranged side by side of each other, so as to constitute a combination of several transversely arranged webs or compartments, several of such compartments being then arranged in succession or in series with each other.

In the embodiments of my invention illustrated in Figures 11, 12 and 13 of the drawing, special provision is made to obtain a very exact configuration of the apertures or recesses provided in the shaping stones or wire drawing devices which are produced in accordance with my invention, a preferred form of this embodiment being shown by way of example in Figure 11 of the drawing in longitudinal sectional view, the several moulds being here shown assembled and inserted into a casing of carbon or the like in the manner described with reference to the preceding modifications. Figure 12 is a plan view, and Figure 13 is an illustration of a detail showing the insertion member $q$ for the moulding of the apertures and the two adjoining moulding members which are connected by said insertion member. The member $q$ is provided with shoulders and projecting portions $r$ adapted to be inserted in apertures $s$ in adjacent moulds.

While in the modifications shown in Fig. 4 conical projections are preferably employed for the casting of the apertures or recesses of the shaping or wire drawing devices which produce an aperture or recess requiring very careful and accurate polishing or finishing, so as to produce absolutely true configurations, and in order to avoid undue friction, when these stones are to be used for the manufacture and the finishing of wires which in the course of their manufacture are passed through the apertures referred to, the modification of Figures 11 to 13 does away with this slight complication.

In the modification shown in Fig. 11 the member which is to serve as the mold for the aperture or recess of the stone is made continuous so as to constitute one single member, and it is provided with projections $r$, studs or the like engaging with apertures in the bottom part of the moulding chamber properly speaking, and in the part immediately above the same, and serving as a cover for said mould. A conventional form of insertion piece of the kind referred to is shown at $q$ in Figure 13, which figure shows a mould for a preferred configuration of aperture. It is provided with projections of suitable kind, as shown for instance at $r$, $r$, which are adapted to nicely fit the corresponding bores $s$ of the confronting mould members. At $f$ the perforations are shown through which the molten metal is forced in the manner hereinbefore described with reference to the previous modifications.

By working in this manner the perforations or apertures for the guiding and shaping of wires or the like in wire drawing machines are obtained with perfectly smooth walls without the necessity of subsequent polishing or finishing. Or only a minimum expenditure of time and labor will be required for the finishing or dressing of such perforations. In the modifications hereinbefore described the perforation is liable to contain tiny-round or sharp projections or edges, in case both corresponding members are not exactly in engagement, when the mould is not perfectly adjusted.

By providing a separate moulding member for the perforation or perforations of the stones I greatly increase the value of these devices for the shaping of wires and the like, as well as for the polishing, grinding and drawing or finishing of cylindrical and other bodies of which the configuration must be absolutely true, and which heretofore necessitated the use of perforations lined with diamond walls or other unalterable material.

It is of importance in the carrying out of the process of my invention that an absolutely uniform and thorough heating both of the moulds and of the metal or similar material injected thereinto shall be effected, so as to secure centrifugal action. This may be effected for instance by first placing the mould with the surrounding tube $a$ into the heating oven or furnace, and leaving it therein until the mould has acquired the melting temperature of the metal to be treated. Then the compressed or other blocks of the metal to be used are placed into the front part of the mould in the heated furnace. The operator then waits until the metal commences to become liquid. Then he subjects the entire apparatus to the action of the centrifugal machine.

By acting in this manner, particularly in the manufacture of very small castings, the inconvenience of having the metal begin to melt before the mould has assumed the required temperature and consequent quick chilling of the metal in the moulds, which interferes with the action of centrifugal force, is avoided. In such cases the moulds may not be completely filled by centrifugal action because the metal is quickly chilled, and, in consequence of the too rapid cooling, tensional strains are set up in the castings, which do not occur in carrying out the process of my invention.

My invention is capable of various other modifications to conform with local conditions, and with the mode of application thereof, and it is to be understood that the invention is not restricted to the particular forms and uses of the various modifications hereinbefore described, but that it is applicable wherever moulding or shaping recesses or the like lined with unalterable material suggest themselves. Among other uses of my invention I may mention the manufacture of eyes or the like for the threads and wires in looms or similar or equivalent kinds of apparatus.

What I claim is:—

1. The process of manufacturing sharply defined castings which consists in fusing difficultly fusible metallic masses, submitting the fused mass to centrifugal action, and receiving the centrifugalized fused mass into moulds.

2. The process of manufacturing sharply defined castings which consists in submitting difficulty fusible, refractory metallic masses of the kind of tungsten, molybdenum, boron, and silicon, which consists in fusing said masses, submitting the fused mass to centrifugal action, and receiving the centrifugalized mass in receiving and moulding means.

3. The process of manufacturing sharply defined castings from tungsten-like, molybdenum-like, silicon-like, and boron-like difficultly fusible metallic masses which consists in placing said masses in heated enclosing means, submitting said masses to fusion and to centrifugal action, and forcing the resulting fused mass by centrifugal action into receiving and moulding means.

4. The process of manufacturing sharply defined castings from tungsten-like, molybdenum-like, boron-like and silicon-like difficultly fusible metallic masses which consists in placing receiving and moulding means in suitable refractory surrounding means, heating said surrounding and moulding means to the fusion temperature of the metallic masses, then introducing said metallic masses into part of said surrounding means, submitting said metallic masses to fusion and to centrifugal action, and thereby forcing the resulting fused metallic masses into said moulding means and completely filling said moulding means with the metallic masses.

5. The process of manufacturing sharply defined castings from difficultly fusible metallic masses, which consists in mounting suitable moulds in substantially refractory enclosing means, placing the metallic masses in said enclosing means and submitting them to fusion temperatures, and submitting the enclosing means with the moulds and metallic means therein contained to centrifugal action after commencement of the fusion.

6. The process of manufacturing wire drawing stones and wire moulds for wire drawing machines, which consists in forcing tungsten-like, molybdenum-like, silicon-like and boron-like difficultly fusible metallic masses in a state of fusion into a series of interconnected suitable moulds by centrifugal action.

7. The process of manufacturing sharply defined castings of great hardness, which consists in assembling a series of interconnected suitable moulds, centrifugalizing said moulds around an exterior axis, submitting tungsten-like, molybdenum-like, silicon-like and boron-like metallic masses to fusion, and causing said masses in the state of fusion to enter said moulds during centrifugalization thereof.

8. Casting mould for sharply defined castings from highly refractory difficultly fusible metallic masses comprising a tubular refractory enclosure, perforated moulding means in said enclosure and in spaced relation to each other, and confronting interengaging projections on the adjacent moulding means, providing a moulding cavity surrounding said projections.

9. Casting mould for sharply defined castings from highly refractory difficultly fusible metallic masses, comprising a tubular refractory enclosure, a series of perforated moulding means in said enclosure in spaced relation with each other, and distance pieces between said moulding means engageable with the adjacent confronting moulding means.

10. Casting apparatus for sharply defined castings from highly refractory, difficultly fusible metallic masses, comprising a wheel-like structure, means to rotate said structure, a tubular refractory enclosure, apertured moulding means mounted in said enclosure in spaced relation to each other and transversely to said enclosure, distance pieces between the confronting moulding means, and in spaced relation to the walls of said enclosure, and cavities between said walls and said distance pieces.

11. Casting apparatus, as specified in claim 10 in combination with means at one end of said enclosure for the mounting of blocks of the metallic masses, and heating means surrounding said enclosure.

12. Casting apparatus for sharply defined castings from highly refractory, difficultly fusible metallic masses, comprising a series of interconnected moulds, a refractory casing for such moulds, means in such casing for the reception of said metallic masses, a rotatable support for said casing, and means to rapidly rotate said casing upon an external axis.

HUGO LOHMANN.